US006445310B1

(12) United States Patent
Bateman et al.

(10) Patent No.: US 6,445,310 B1
(45) Date of Patent: *Sep. 3, 2002

(54) APPARATUS, METHODS, COMPUTER PROGRAM PRODUCTS FOR GENERATING A RUNWAY FIELD CLEARANCE FLOOR ENVELOPE ABOUT A SELECTED RUNWAY

(75) Inventors: C. Don Bateman, Bellevue; Steven C. Johnson, Issaquah; Scott Gremmert, Redmond; Yasuo Ishihara, Kirkland, all of WA (US)

(73) Assignee: Honeywell International, Inc., Morristown, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/496,298

(22) Filed: Feb. 1, 2000

Related U.S. Application Data

(60) Provisional application No. 60/118,215, filed on Feb. 1, 1999.

(51) Int. Cl.[7] .............................................. G08B 23/00
(52) U.S. Cl. ...................... 340/970; 340/945; 340/951; 340/963; 701/301
(58) Field of Search ................................ 340/970, 945, 340/947, 951, 963; 701/9, 16, 301, 4, 5, 8; 342/65

(56) References Cited

U.S. PATENT DOCUMENTS

| 3,715,718 A | 2/1973 | Astengo ...................... 340/970 |
| 3,925,751 A | 12/1975 | Bateman et al. ............ 340/967 |

(List continued on next page.)

FOREIGN PATENT DOCUMENTS

| CA | 1033828 | 6/1978 | ................... 343/15 |
| DE | 4304561 A | 8/1994 | ............ B64D/45/04 |
| DE | 4327706 A1 | 2/1995 | ............ G08G/5/04 |
| EP | 0790487 A2 | 8/1987 | ........... G01C/23/00 |
| FR | 2689668 | 10/1993 | ............ G08G/5/04 |
| FR | 2721130 | 12/1995 | ............ G08G/5/04 |
| GB | 2 266 286 A | 10/1993 | ........... B64D/45/04 |
| WO | WO 85/03566 | 8/1985 | ............ G01C/5/00 |

OTHER PUBLICATIONS

Baldwin et al. "GPS–Based Terrain Avoidance Systems—A Solution for General Aviation Controlled Flight into Terrain," *Rannoch Corporation,* (date unknown).

(List continued on next page.)

*Primary Examiner*—Jeffery Hofsass
*Assistant Examiner*—Toan Pham

(57) ABSTRACT

The present invention provides apparatus, methods, and computer program products that monitor the altitude of an aircraft with respect to a selected runway. If the attitude of the aircraft is below a minimum glideslope with respect to the selected runway, the apparatus, methods, and computer program products of the present invention alert the flight crew, such that the altitude of the aircraft can be increased. This, in turn, increases time for reaction to abrupt changes in elevation near the selected runway. Specifically, the apparatus, methods, and computer program products of the present invention define a runway field clearance floor envelope about the selected runway that represents different preselected altitudes above the selected runway at respective distances from the selected runway. The apparatus, method, and computer program products of the present invention compare the altitude of the aircraft with respect to the selected runway to the runway field clearance floor envelope. If the altitude of the aircraft is less than the minimum altitude indicated for the aircraft at the given distance , the apparatus, method, and computer program products of the present invention provide an indication to the flight crew. Since the runway field clearance floor envelope is constructed relative to the runway by defining minimum altitude values that should be maintained relative to the elevation of the runway, the indications generated to the flight crew should provide a desired reaction time for the flight crew to adjust the aircraft to abrupt changes in elevation at or near a selected runway.

35 Claims, 7 Drawing Sheets

U.S. PATENT DOCUMENTS

| | | | |
|---|---|---|---|
| 3,934,221 A | 1/1976 | Bateman et al. ............ | 340/970 |
| 3,934,222 A | 1/1976 | Bateman et al. ............ | 340/970 |
| 3,936,796 A | 2/1976 | Bateman et al. ............ | 340/970 |
| 3,944,968 A | 3/1976 | Bateman et al. ............ | 340/970 |
| 3,947,808 A | 3/1976 | Bateman ..................... | 340/970 |
| 3,947,810 A | 3/1976 | Bateman et al. ............ | 340/970 |
| 3,958,218 A | 5/1976 | Bateman ..................... | 340/970 |
| 3,958,219 A | 5/1976 | Bateman ..................... | 340/970 |
| 4,030,065 A | 6/1977 | Bateman ..................... | 340/970 |
| 4,060,793 A | 11/1977 | Bateman ..................... | 340/970 |
| 4,063,073 A | 12/1977 | Strayer ...................... | 364/439 |
| 4,215,334 A | 7/1980 | Bateman ..................... | 340/970 |
| 4,224,669 A | 9/1980 | Brame ........................ | 364/433 |
| 4,319,218 A | 3/1982 | Bateman ..................... | 340/970 |
| 4,433,323 A * | 2/1984 | Grove ........................ | 340/970 |
| 4,484,192 A | 11/1984 | Seitz et al. ................. | 340/995 |
| 4,495,483 A * | 1/1985 | Bateman ..................... | 340/970 |
| 4,567,483 A | 1/1986 | Bateman et al. ............ | 340/970 |
| 4,642,775 A | 2/1987 | Cline et al. ................. | 364/443 |
| 4,646,244 A | 2/1987 | Bateman et al. ............ | 364/461 |
| 4,675,823 A | 6/1987 | Noland ....................... | 364/460 |
| 4,835,537 A | 5/1989 | Manion ....................... | 340/961 |
| 4,857,923 A * | 8/1989 | Bateman ..................... | 340/970 |
| 4,894,655 A | 1/1990 | Joguet et al. ............... | 340/988 |
| 4,903,212 A | 2/1990 | Yokouchi et al. ...... | 364/449.95 |
| 4,912,645 A | 3/1990 | Kakihara et al. ........ | 364/449.2 |
| 4,914,436 A * | 4/1990 | Bateman et al. ............ | 340/970 |
| 4,914,733 A | 4/1990 | Gralnick ..................... | 340/961 |
| 4,916,448 A | 4/1990 | Thor .......................... | 340/970 |
| 4,924,401 A | 5/1990 | Bice et al. ............ | 364/424.015 |
| 4,947,164 A | 8/1990 | Bateman ..................... | 340/968 |
| 4,954,959 A | 9/1990 | Moroto et al. ............ | 364/449.5 |
| 4,987,413 A | 1/1991 | Grove ........................ | 340/970 |
| 5,086,396 A | 2/1992 | Waruszewski, Jr. ......... | 364/454 |
| 5,136,512 A | 8/1992 | Le Borne ................... | 364/461 |
| 5,140,532 A | 8/1992 | Beckwith, Jr. et al. ..... | 395/101 |
| 5,153,588 A | 10/1992 | Muller ....................... | 340/968 |
| 5,155,688 A | 10/1992 | Tanaka et al. .............. | 364/454 |
| 5,157,615 A | 10/1992 | Brodegard .................. | 364/461 |
| 5,196,847 A | 3/1993 | Bateman ..................... | 340/970 |
| 5,202,690 A | 4/1993 | Frederick .................... | 342/26 |
| 5,220,322 A * | 6/1993 | Bateman et al. ............ | 340/970 |
| 5,252,978 A | 10/1993 | Priestley ..................... | 342/29 |
| 5,257,195 A | 10/1993 | Hirata .................... | 364/449.95 |
| 5,260,702 A * | 11/1993 | Thompson .................. | 340/970 |
| 5,265,025 A | 11/1993 | Hirata ..................... | 364/449.7 |
| 5,285,391 A | 2/1994 | Smith, Jr. et al. ........... | 364/443 |
| 5,293,163 A | 3/1994 | Kakihara et al. ........... | 340/995 |
| 5,293,318 A | 3/1994 | Fukushima ............ | 364/449.95 |
| 5,337,242 A | 8/1994 | Yamamoto et al. ....... | 364/449.2 |
| 5,414,631 A | 5/1995 | Denoize et al. ............. | 364/461 |
| 5,428,354 A * | 6/1995 | Torget ........................ | 340/963 |
| 5,442,556 A | 8/1995 | Boyes et al. ................ | 364/461 |
| 5,486,821 A | 1/1996 | Stevens et al. ............. | 340/970 |
| 5,488,563 A | 1/1996 | Chazelle et al. ............ | 364/461 |
| 5,495,249 A | 2/1996 | Chazelle et al. ............. | 342/36 |
| 5,519,392 A | 5/1996 | Oder et al. ................. | 340/995 |
| 5,526,000 A | 6/1996 | Chazelle et al. ............ | 342/407 |
| 5,581,259 A | 12/1996 | Schipper ..................... | 342/451 |
| 5,608,392 A | 3/1997 | Faivre et al. ............... | 340/967 |
| 5,638,282 A | 6/1997 | Chazelle et al. ............ | 364/461 |
| 5,661,486 A | 8/1997 | Faivre et al. ................. | 342/33 |
| 5,677,842 A | 10/1997 | Denoize et al. ............. | 364/461 |
| 5,798,712 A | 8/1998 | Coquin ....................... | 340/970 |
| 5,839,080 A * | 11/1998 | Muller et al. ................... | 701/9 |
| 6,088,634 A * | 7/2000 | Muller et al. ................... | 701/9 |
| 6,154,151 A * | 11/2000 | McElreath et al. .......... | 340/970 |

OTHER PUBLICATIONS

Bateman, "How to Terrain–proof the World's Airline Fleet," *Sundstrand Data Control. Flight Safety Foundation,* 44th IASS, Singapore, 1991.

Bennett and Cockburn,"Pilot Monitoring of Display Enhancements Generated From A Digital Data Base," *AGARD Conference Proceedings No. 456,* 1990.

Bennett, "The Use of Digital Map Data to Provide Enhanced Navigation and Displays for Poor Weather Penetration and Recovery," *GEC Marconi Avionics,* 1993.

Bice, "Development of an Automated Ground Collision Avoidance System Using A Digital Terrain Database," *Wright Patterson AFB,* 1989.

DiPadua et al., "Comparison of the General Dynamics Ground Clobber Algorithm with the GCAS and Laws Algorithms," *Crew Station Design Facility, Wright Patterson AFB,* 1988.

Fitzgerald and Brunner, "Use of High–Fidelity Simulation in the Development of an F/A–18 Active Ground Collision Avoidance System," *SAE International,* 1992.

Fitzsimmons, "First moves towards an "intelligent" GPWS," *Interavia/Aerospace World,* 1993.

Grey and Dale, "Advances in Techniques and Technologies for Air Vehicle Navigation and Guidance" *NATO Advisory Group for Aerospace Research and Development (AGARD),* Guidance and Control Pane 48th Symposium, 1989.

Hewitt, "The Use of Terrain Databased for Avionic Systems," *The Institution of Electrical Engineers,* 1995.

Hopkins et al., "Quo Vadis?," *Flight International 11–17:*37–40, Mar., 1992.

"GCAS—Past, Present and Future of Alert Systems for Abnormal Closure to Ground," *Abstract,* 1993, translation by Kei Kino. (Japanese article with English Translation).

Kuchar and Hansman, Jr., "Part–Task Simulator Evaluations of Advanced Terrain Display," Preprints, SAE Aerotech Conference and Exposition, Anaheim, CA, 1993.

Lawrence, "Modern Inertial Technology," Springer–Verlag New York, Inc., 1993.

LeBorn, "A Generic Ground Collision Avoidance System for Tactical Aircraft," *Cubic Defense Systems,* San Diego, California. IEEE National Aerospace and Electronics Conference, 1988.

Moller and Sachs, "Synthetic Vision for Enhancing Poor Visibility Flight Operations," *IEEE AES Systems:*27–42, 1994.

Rueb, et al., "Evaluation of the C/EK/KC–135 Ground Collision Avoidance System (GCAS) (Study 2)," *Integrated Engineering and Tech. Management Directorate,* Wright-Patterson AFB, Final Report, 1993.

Shah, "Ground Collision Warning System Performance Criteria for High Maneuverability Aircraft," *Flight Stability and Control Branch Wright* Patterson AFB, 1988.

Stevens, "Terprom Helps Low–Altitude Flight,: Terrain Navigation System for Flying at Low Height," *Elektronica* 1986, (Dutch) w/English Transl.

"Safety Through Interactions and International Standards," *Proceedings of the Flight Safety Foundation,* 46th Annual International Air Safety Seminar, Kuala Lumpuir, Malaysia, 1993.

Williams and Mitchell, "Effects of Integrated Flight Path and Terrain Displays on Controlled Flight into Terrain," Center for Human–Machine Systems Research, School of Industrial and Systems Engineering, Georgia Institute of Technology.

Young, "Warning System Concepts to Prevent Controlled Flight Into Terrain (CFIT)," *Defense Systems & Electronics Group,* Texas Instruments, Inc. IEEE, 1993.

"BAE Terrain Software Bound for USF–16," *Flight International,* Aug., 1993, Computer Printout.

"Technology and Air Attack," *Asian Defense Journal,* 1993, Computer Printout.

The F–16 Digital Terrain System, British Aerospace, The Institute of Electrical Engineers, 1995.

Fitzsimons, "Upgrade Classics—Navigating by Numbers," Defense System & Modernisation (DSM), Jun. 01, 1997, p. 11, v.10, No. 02, Computer Printout.

"Terrain Databases and Their Use In Navigation and Collision Avoidance," Institute of Electrical Engineers, Electronics Division Colloquim, Professional Group E15, Radar Sonar and Navigation Systems, *Digest No. 1995/066* , 1995, paper by Allerton.

Kuchar and Hansman, Jr., "Part–Task Simulation Study of Candidate Terrain Alerting Displays," Department of Aeronautics and Astronautics, Massachusetts Institute of Technology, Jun. 30, 1993.

Kuchar and Hansman, Jr., "Advanced Terrain Displays for Transport Category Aircraft," ALS, Department of Aeronautics & Astronautics, Massachusetts Institute of Technology, Aug. 23, 1991.

"The Future Flight Deck," The Flight Operations Group of the Royal Aeronautical Society and The Guild of Air Pilots and Air Navigators of London.

Hewitt et al., "A Ground and Obstacle Collision Avoidance Technique (GOCAT)," *IEEE,* May, 1991.

Moore, "We Have the Technology," *Flying Safety,* Jun., 1992.

Hughes, "Glass Cockpit Study Reveals Human Factors Problems" *Aviation Week & Space Technology,* Aug. 7, 1989.

Hoffman and Burnham, "Airborne Electronic Map systems," *IEEE,* 769–772, 1981.

Burnham and Kline, "Airborne Electronic Terrain Map System, Part 2–Applications," *IEEE,* 786–789, 1981.

Sander, "Algorithms for an Adaptive Dynamic Window in Electronic Map systems," Air Force Wright Aeronautical Laboratories.

Weber and Opttek, "Airborne Electronic Terrain Map System," *IEEE,* 773–778, 1981.

Small, "The Electronic Terrain Map—A New Avionics Integrator–," Avionics Laboratory, Wright–Patterson Air Force Base, Ohio, 356–359.

Tang and Mealy, "Application of Multiple Model Estimation Techniques to a Recursive Terrain Height Correlation System," *IEEE,* 757–764, 1981.

Woodward and Hoover, "Passive Terrain Following Using Stored Map and Global Positioning System," *IEEE,* 779–785, 1981.

"Air Force Evaluating Model of Electronic Map Technology," *Aviation Week & space Technology, 76,* Dec. 19, 1983.

Kuchar and Hansman, Jr., "An Exploratory Study of Plan-View Terrain Displays for Air Carier Operations," *The International Journal of Aviation Psychology,*3(1):39–54, 1993.

Paper re: Proceedings of the National Technical Meeting, The Institute of Navigation, Anaheim, California dated Jan. 20–23, 1987 (4 pages).

Paper re: A New Approach to CFIT Prevention: GCAS Ground Collision Avoidance System, Dassault Electronique, Rockwell Avionics, Author: Jean–Francis Manfroy and Lothar J. Taylor dated 11/95 (12 pages).

Proctor, "Avionics Unit Eyes Expanded Markets," *Aviation Week & Space Technology,* Aug. 15, 1994, p. 41.

Proctor, "Terrain Alert Graphics Tested on cockpit Displays," *Aviation Week & Space Technology, Aug. 8, 1994,* p. 51.

Kerrill, Tamara, "Satellite–Guided Airplane Flies Righ Into the Future," *Chicago Sun–Times,* Oct. 28, 1994, p. 22.

Malm, Richard, "Engineers Can Tap Into Global Positioning System" *Engineering Times,* Apr., 1995, pp. 11–14.

GCAS Publication provided by A/S Library Services, Source and Date Unknown, pp. 185–190.

* cited by examiner

APPARATUS, METHODS, COMPUTER PROGRAM PRODUCTS FOR GENERATING A RUNWAY FIELD CLEARANCE FLOOR ENVELOPE ABOUT A SELECTED RUNWAY

RELATED APPLICATIONS

The present application claims priority from U.S. Provisional Application Ser. No. 60/118,215 entitled OBSTACLE CLEARANCE FLOOR ALERTING ALGORITHM, filed Feb. 1, 1999, the contents of which are incorporated herein by reference.

FIELD OF THE INVENTION

The present invention relates generally to ground proximity warning systems for use in aircraft. More particularly, the apparatus, methods, and computer program products of the present invention relate to generating a runway field clearance floor envelope about a selected runway for use by a ground proximity warning system to provide appropriate ground proximity warning alerts.

BACKGROUND OF THE INVENTION

An important advancement in aircraft flight safety has been the development of ground proximity warning systems. These warning systems analyze the flight parameters of the aircraft and the terrain surrounding the aircraft. Based on this analysis, these warning systems provide alerts to the flight crew concerning possible inadvertent collisions with terrain or other obstacles. Further, these ground proximity warning systems ensure that the aircraft maintains a minimum altitude with regard to terrain underlying the aircraft.

For example, one ground proximity warning system has been developed that generates terrain caution and warning envelopes that extend forward of the aircraft based on the position and flight parameters of the aircraft. Terrain and obstacles that pierce the terrain caution and warning envelopes are displayed to the flight crew as potential ground proximity problems by appropriate alarms or warnings. Further, and importantly, the ground proximity warning system also generates terrain clearance floor envelopes that provide minimum altitudes that the aircraft should maintain above terrain underlying the aircraft. If the altitude of the aircraft with respect to the underlying terrain is less than the minimum altitude required by the terrain clearance floor envelope, the ground proximity warning system will provide appropriate alerts.

FIG. 1 illustrates a typical terrain clearance floor envelope 10 generated by at least one ground proximity warning system. The terrain clearance floor envelope is typically generated with reference to a selected runway 12. For different distances from the selected runway, the terrain clearance floor envelope prescribes different minimum altitudes that the aircraft should maintain above terrain currently underlying the aircraft. Beyond some maximum distance 14 from the selected runway, the aircraft must maintain at least some minimum altitude 16 above underlying terrain.

For example, if an aircraft is approximately 5 nm from a selected runway, the terrain clearance floor may prescribe that the aircraft should maintain at least an altitude of 400 ft above terrain underlying the aircraft. As such, if the aircraft is flying over terrain that has an elevation of 5,000 ft, the aircraft should maintain an altitude of at least 5,400 ft. In this example, if the aircraft dips below 5,400 ft altitude, the ground proximity warning system will provide appropriate alerts.

Importantly, with reference to FIG. 1, for distances closer to the selected runway, the terrain clearance floor envelope requires smaller minimum clearance altitudes that the aircraft should maintain above current terrain. This portion of the terrain clearance floor envelope reflects a landing pattern of the aircraft. The altitudes at various distances from the selected runway are selected to provide ground proximity warning protection, while also reducing generation of nuisance alarms that may disrupt the flight crew during landing. For example, when the aircraft is 2 nm from the selected runway, the flight crew will not receive an alert unless the aircraft dips to an altitude that is less than 200 ft above the underlying terrain.

For most instances, the terrain clearance floor envelopes generated by the ground proximity warning system, such as the terrain clearance floor envelope illustrated in FIG. 1, are generally advantageous as they provide ground proximity warning protection, while at the same time reducing nuisance alarms. However, there may be specific instances where additional ground proximity warning protection may be desired.

Specifically, as described above, the terrain clearance floor envelope requires minimum altitudes that the aircraft should maintain above current terrain depending upon the distance between the aircraft and selected runway. While the terrain clearance floor envelope is typically more than adequate for ground proximity warning protection, problems may occur where terrain near the selected runway, (e.g., within 2 to 15nm of the selected runway), is at a significant lower elevation than the elevation of the selected runway or terrain or obstacles in close proximity to the selected runway. In this instance, the current terrain clearance floor envelopes generated by the ground proximity warning system may not provide desired warning time for reacting to these changes in elevation.

Specifically, FIG. 2 illustrates a situation where providing added reaction time to the flight crew of the aircraft may be desired. FIG. 2 illustrates a situation where the elevation of the selected runway 12 or terrain or obstacles proximate to the selected runway are at a significantly higher elevation, (e.g., elevation 800 ft), than terrain 18 less proximate to the selected runway, (e.g., elevation 300 ft). In this situation, it may be desired to provide an increased reaction time to the flight crew of the abrupt change in elevation that occurs near the selected runway.

In particular, with reference to FIG. 2, if an aircraft 8 is more than 15 nm from the selected runway, (see position 20), the aircraft will maintain an altitude above the terrain underlying the aircraft of at least 700 ft to avoid ground proximity alarms. The 700 ft altitude buffer between the aircraft and underlying terrain typically provides desired reaction time for reacting to changes in the elevation of the terrain. However, as the aircraft approaches the selected runway, the minimum altitude that the aircraft must maintain above underlying terrain decreases. As such, when the aircraft is in close proximity to the selected runway, the flight crew will not receive an alert until the aircraft is much closer to the underlying terrain. This reduction of the required altitude above underlying terrain, in turn, reduces the reaction time for the flight crew to react to abrupt changes in elevation.

For example, at 5 nm, (i.e, 4+K), from the selected runway, (see point 22), the aircraft need only maintain an altitude of 400 ft above underlying terrain to avoid generation of alarms. Further, at positions, (see point 24), closer to the selected runway, the terrain clearance floor envelope decreases to even lower altitude requirements for the aircraft to maintain above underlying terrain. These reduced altitude requirements further reduce the reaction time for the flight crew to react to abrupt changes in elevation near the selected runway.

While reduction of the minimum altitude between the aircraft and underlying terrain as the aircraft approaches the selected runway is typically not problematic for most landing procedures, it may be problematic in the above example shown in FIG. 2. Specifically, due to the terrain clearance floor envelope, as long as the aircraft remains at an altitude above underlying terrain that is greater than the altitude defined by the terrain clearance floor envelope, the aircraft can continue to descend as it approaches the selected runway without generating alarms concerning the altitude of the aircraft. As such, if there is an abrupt upward change in the elevation of terrain in close proximity to the selected runway, (see point 25), the flight crew may not receive an alert from the terrain clearance floor envelope until the aircraft is within the range of 10 to 100 ft above the terrain, depending on distance to the selected runway. In this instance, the alert provided by the ground proximity warning system may not provide the flight crew with a desired time to react to the change in elevation. Specifically, the flight crew may have to maneuver the aircraft in an abrupt fashion to avoid the terrain, which may be unsettling to the flight crew and possibly the passengers on the aircraft.

One solution to the above problem may be to increase the minimum altitudes defined by the terrain clearance floor envelope for distances closer to the selected runway. However, this is somewhat problematic as it may increase the generation of nuisance alarms in those instances in which there is not a significant change in elevation near the selected runway.

In addition to not providing a desired reaction time in instances in which the elevation of the terrain changes abruptly either at or near the selected runway, the terrain clearance floor envelope also does not necessarily provide alerts to the flight crew if the aircraft is below a predetermined minimum glideslope with respect to the selected runway. Specifically, with reference to FIG. 2, because the terrain clearance floor envelope is constructed based on the altitude of the aircraft with respect to underlying terrain and not based on the elevation of the selected runway, an aircraft that is above the terrain clearance floor envelope will not generate an alert even though the aircraft may be below the minimum glideslope that is recommended for the selected runway. As such, the flight crew will not be notified until shortly before reaching the runway that the aircraft is approaching the selected runway at an undesirably shallow angle, thereby leaving little time for the flight crew to adjust the landing pattern.

For each of these reasons, it would therefore be desirable to provide a ground proximity warning system that provides increased reaction time for abrupt changes in elevation near a selected runway and that provides timely alerts if the aircraft sinks below the minimum glideslope that is recommended for the selected runway, while also not unnecessarily increasing the number of nuisance alarms.

SUMMARY OF THE INVENTION

The apparatus, method and computer program product of the present invention therefore defines a runway field clearance floor envelope about a selected runway that represents different preselected altitudes above the selected runway at respective distances from the selected runway. By comparing the position of the aircraft to the runway field clearance floor envelope, an indication, such as an alarm, can be provided in instances in which the aircraft is positioned below the runway field clearance floor envelope. Since the runway field clearance floor envelope that is constructed by the apparatus, method and computer program product of the present invention is constructed relative to the runway by defining minimum altitude values that should be maintained relative to the elevation of the runway and not relative to the elevation of the terrain currently underlying the aircraft, the indications provided by the apparatus, method and computer program product of the present invention should provide the flight crew with ample reaction time in order to accommodate rather abrupt changes in elevation at or near a selected runway while not unnecessarily increasing the number of nuisance alarms. In addition, since the runway field clearance floor envelope oftentimes represents the minimum glideslope recommended for the selected runway, the apparatus, method and computer program product also provides the flight crew with a timely indication if the aircraft sinks below the minimum recommended glideslope.

In one embodiment, the apparatus, method, and computer program product compare a distance between the aircraft and the selected runway to the runway clearance floor envelope and determine a preselected altitude of the aircraft above the selected runway based upon the runway field clearance floor envelope. By comparing the preselected altitude to the actual altitude of the aircraft above the selected runway, an indication can be provided if the actual altitude of the aircraft above the selected runway is no more than the preselected altitude.

The runway field clearance floor envelope is preferably defined to have at least two boundaries. Moreover, at least one of the boundaries is preferably based on at least one of a runway position quality factor, an altitude data quality factor, and an aircraft position quality factor. As such, the apparatus, method and computer program product of the present invention determine the boundaries of the runway field clearance floor envelope based upon the uncertainties or, conversely, the quality with which the respective positions of the runway and the aircraft can be defined. For example, the inner boundary of the runway field clearance floor envelope can be defined proximate the selected runway by summing the runway position quality factor, altitude data quality factor, and aircraft position quality factor. In addition, an outer boundary of the runway field clearance floor envelope can be defined by summing the runway position quality factor, the altitude data quality factor, the aircraft position quality factor, and a predetermined outer distance representing a predetermined distance from the selected runway. As such, the outer boundary of the runway field clearance floor envelope will be displaced by the predetermined outer distance from the inner boundary. Moreover, the runway field clearance floor envelope can be further defined to have a preselected inner boundary altitude at the inner boundary and a preselected outer boundary altitude at the outer boundary, such that the resulting runway field clearance floor envelope has a corresponding slope therebetween.

In one embodiment, the position and elevation data for the selected runway are stored in a memory device. As such, the altitude of the aircraft above the selected runway can be determined by accessing the elevation data for the selected runway and subtracting the elevation of the selected runway from the actual altitude of the aircraft. In this regard, the altitude of the aircraft can be a calculated geometric altitude representing the altitude of the aircraft above sea level.

In addition to constructing the runway field clearance floor envelope, the apparatus, method and computer program product of one embodiment of the present invention can also define a terrain clearance floor envelope about the selected runway representing different preselected minimum altitudes of the aircraft above the currently underlying terrain at different distances between the aircraft and the selected runway. In this embodiment, the altitude of the aircraft above the underlying terrain at its current position can be compared to the corresponding minimum altitude defined by the terrain clearance floor envelope. If the aircraft falls or dips below the terrain clearance floor envelope, as indicated by the altitude of the aircraft above the terrain being no more than the minimum altitude defined by the terrain clearance floor envelope, an additional indication or alarm can be provided. Preferably, a ground proximity alert is generated if the aircraft falls below either the runway field clearance floor envelope or the terrain clearance floor envelope for more than the predetermined time. In this regard, if the aircraft falls below the runway field clearance floor envelope for more than the predetermined time, the altitude value that would otherwise indicate the altitude of the aircraft above the selected runway can be increased by a predetermined amount. As such, the aircraft must decrease in altitude by the predetermined amount before the next ground proximity alert will be generated. Likewise, if the aircraft falls below the terrain clearance floor envelope for more than the predetermined time, the altitude of the aircraft can be increased by a selected amount. As such, the aircraft must decrease in altitude by the selected amount before the next ground proximity alert will be generated.

The apparatus, method and computer program product of the present invention therefore provides a mechanism for detecting rather abrupt changes in elevation near a selected runway sufficiently far in advance that the flight crew is provided with ample time to make any necessary changes in the flight path. As described, the apparatus, method and computer program product of the present invention typically do not replace the terrain clearance floor envelope that has been traditionally generated about a selected runway. Instead, the apparatus, method and computer program product of the present invention generate an additional runway field clearance floor envelope.

As such, the apparatus, method and computer program product of the present invention also significantly increase protection, especially in those instances in which the terrain abruptly changes at or near an selected runway, by providing an alert either if the aircraft does not remain at an altitude sufficiently above the elevation of the runway or if the aircraft does not remain at a sufficient elevation above the currently underlying terrain.

DETAILED DESCRIPTION OF THE INVENTION

Figure 1:
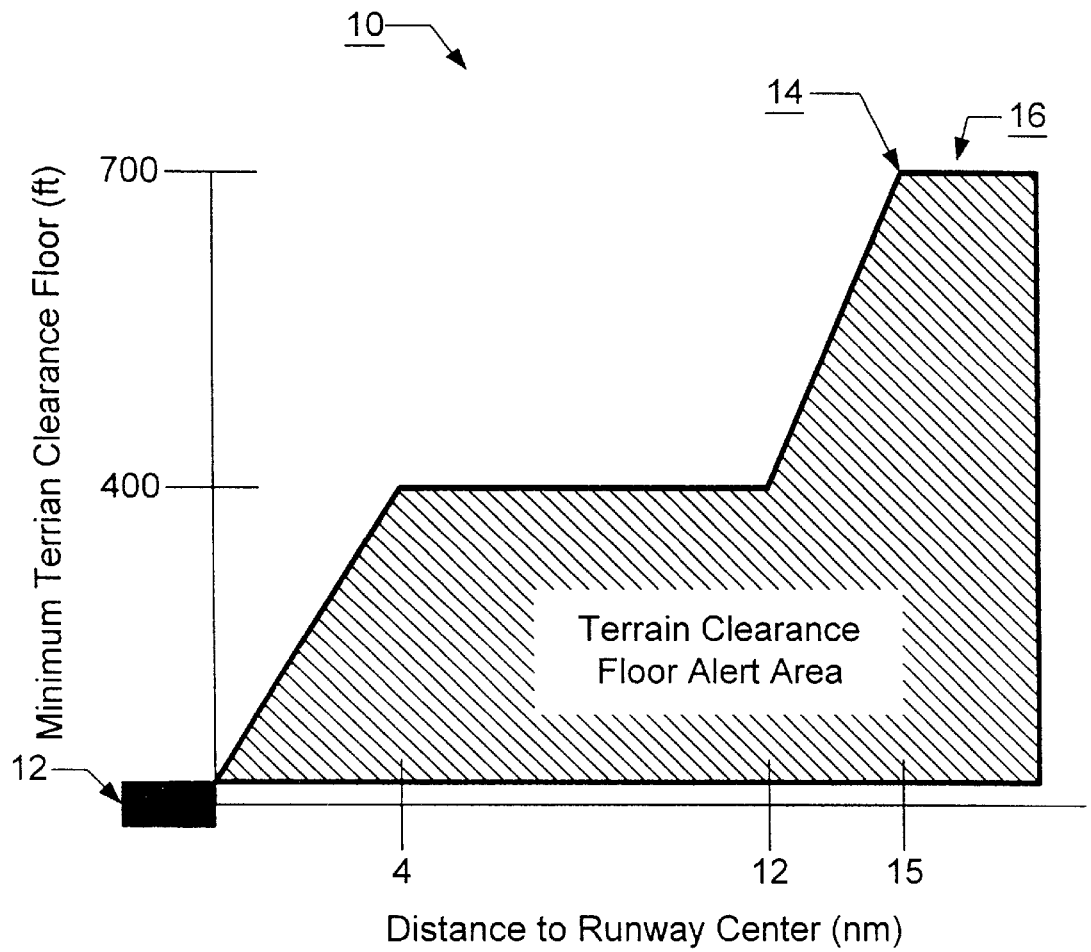
FIG. 1 is a radial, cross-sectional view of a terrain clearance floor envelope.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As discussed above, the terrain clearance floor envelope generated by at least one conventional ground proximity warning system typically provides a desired reaction time for the flight crew of an aircraft to react to ground proximity alerts. However, in instances where there are abrupt changes in the elevation of either the selected runway or terrain or obstacles in close proximity to the selected runway, the terrain clearance floor envelope may not provide a desired reaction time to the flight crew of an aircraft. In addition, the terrain clearance floor envelope also does not necessarily provide alerts to the flight crew if the aircraft is below a predetermined minimum glideslope with respect to the selected runway.

The terrain clearance floor envelope defined by conventional ground proximity warning systems is an envelope that defines minimum altitudes that an aircraft should maintain above terrain underlying the aircraft. The terrain clearance floor envelope, however, does not define minimum altitudes that the aircraft should maintain above the selected runway. As such, in instances in which there are abrupt differences in elevation between the selected runway and terrain proximate to the selected runway, the terrain clearance floor envelope may not provide any indication that the aircraft has sank below the minimum glideslope recommended for the selected runway and may not provide a desired reaction time to the flight crew of the aircraft concerning the abrupt change in elevation.

In light of this, the present invention provides several apparatus, methods, and computer program products for determining whether an aircraft is located at a desired position with respect to a selected runway. Importantly, the apparatus, methods. and computer program products of the present invention define a runway field clearance floor envelope about the selected runway representing different preselected altitudes above the selected runway at respective distances from the selected runway. The position of the aircraft is then compared to the runway field clearance floor envelope. If the aircraft is positioned below the runway field clearance floor envelope, the apparatus, methods, and computer products of the present invention provide an indication to the flight crew of the aircraft.

Importantly, unlike the terrain clearance floor envelope, the runway field clearance floor envelope of the present invention is defined based on minimum altitudes that an aircraft should maintain at selected distances from the selected runway, as opposed to altitudes of the aircraft above underlying terrain. As such, in instances in which the aircraft is at an altitude above underlying terrain that exceeds the minimum altitude required by the terrain clearance floor envelope, but is at an altitude with respect to the selected runway that is below the runway field clearance floor envelope, the apparatus, methods, and computer program products will provide appropriate alerts to the flight crew of the aircraft. This, in turn, allows the ground proximity warning system to provide alarms concerning proximity of the aircraft to underlying terrain, while also providing proper alarms when the aircraft is not at a desired altitude with respect to the selected runway.

For illustrative purposes, the various apparatus, methods, and computer program products of the present invention are illustrated and described below in con unction with the ground proximity warning system of U.S. Pat. No. 5,839,080 to Muller, entitled "Terrain Awareness System." The contents of U.S. Pat. No. 5,839,080 are incorporated herein by reference. It should be apparent, however, that the apparatus, methods and computer program products of the present invention can be utilized either independently or in conjunction with other systems, if so desired.

Figure 4:
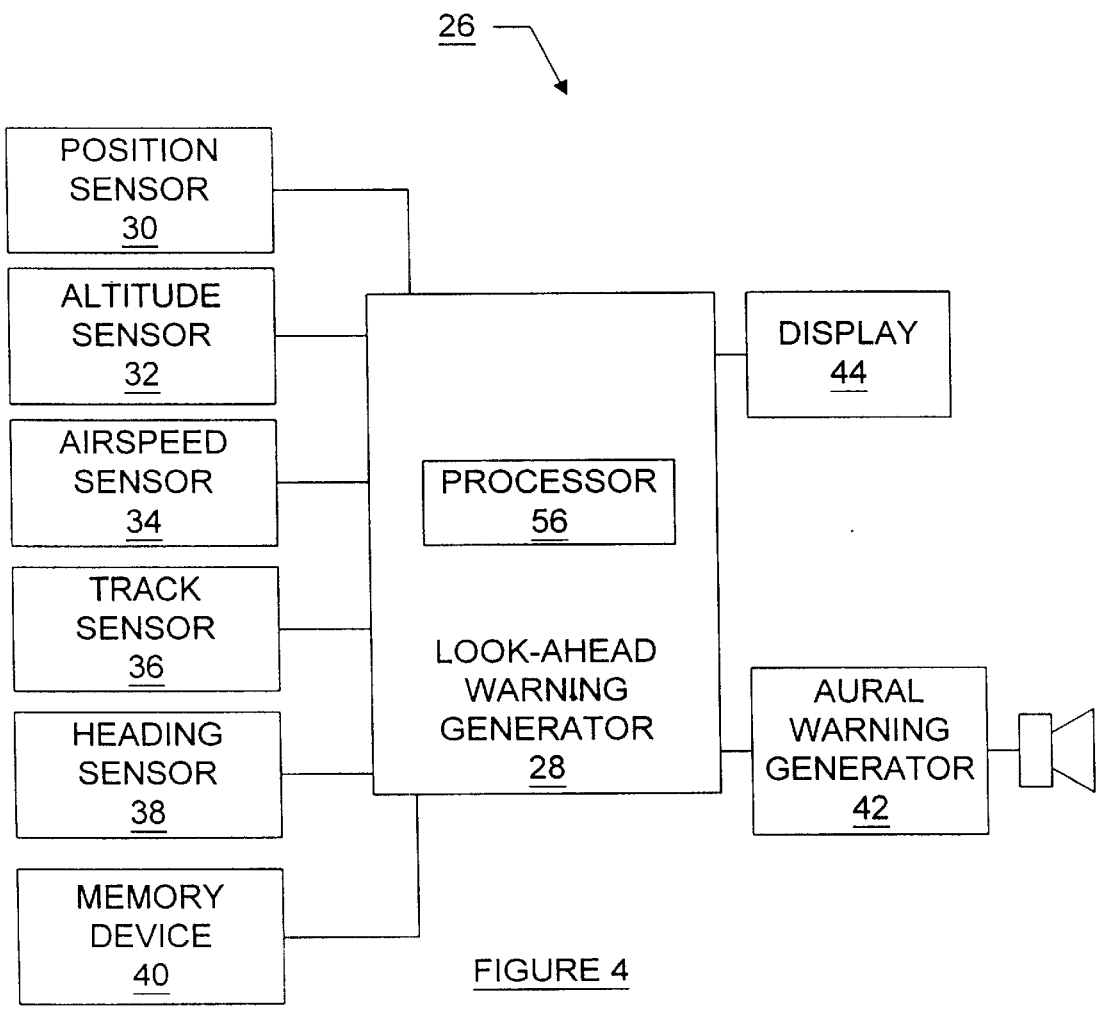
FIG. 4 is a block diagram of an apparatus for defining a runway field clearance floor envelope about a selected runway and for comparing the position of an aircraft with respect thereto according to one embodiment of the present invention.

FIG. 4 depicts many of the components of the ground proximity warning system of U.S. Pat. No. 5,839,080 in simplified block form for illustrative purposes, however, it is understood that the functions of these blocks are consistent with and contain many of the same components as the ground proximity warning system described in U.S. Pat. No. 5,839,080. The ground proximity warning system 26 includes a look-ahead warning generator 28 that analyzes terrain and aircraft data and generates terrain clearance floor profiles surrounding the aircraft. Based on these terrain profiles and the position, track, and ground speed of the aircraft, the look-ahead warning generator generates aural and/or visual warning alarms related to the proximity of the aircraft to the surrounding terrain. Some of the sensors that provide the look-ahead warning generator with data input concerning the aircraft are depicted. Specifically, the look-ahead warning generator receives positional data from a position sensor 30. The position sensor may be a portion of a global positioning system (GPS), inertial navigation system (INS), or flight management system (FMS). The look-ahead warning generator also receives altitude and airspeed data from an altitude sensor 32 and airspeed sensor 34, respectively, and aircraft track and heading information from track 36 and heading 38 sensors, respectively.

In addition to receiving data concerning the aircraft, the look-ahead warning system also receives data concerning the terrain surrounding the aircraft. Specifically, the look-ahead warning generator is also connected to a memory device 40 that contains a searchable data base of data relating, among other things, to the position and elevation of various terrain features and also elevation, position, and quality information concerning runways.

In normal operation, the look-ahead warning generator receives data concerning the aircraft from the various sensors. Additionally, the look-ahead warning generator accesses terrain and airport information from the memory device concerning the terrain surrounding the aircraft and a selected runway-typically the runway that is closest in proximity to the aircraft's current position or, alternatively, some other predetermined or predicted runway. Based on the current position, distance to the selected runway, altitude, speed, track, etc. of the aircraft, the look-ahead warning generator generates terrain advisory and generates alerts via either an aural warning generator 42 and/or a display 44 as to terrain or other obstacles that penetrate the terrain advisory and warning envelopes. In addition. the look-ahead warning generator generates a terrain clearance floor envelope and produces alerts if the aircraft dips below the terrain clearance floor envelope.

Figure 2:
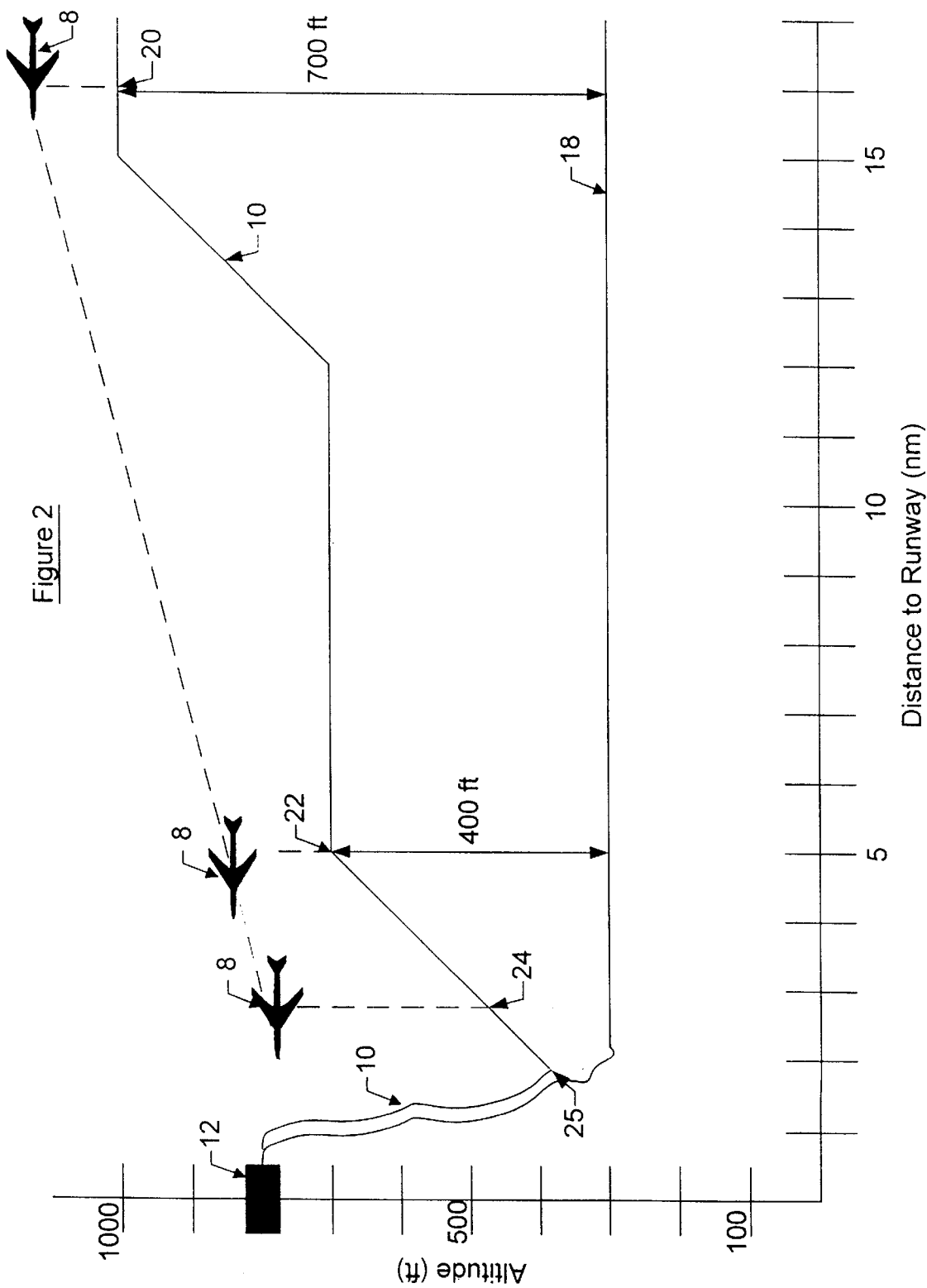
FIG. 2 is a side view illustrating graphically use of a terrain clearance floor envelope by an aircraft to maintain at least a minimum altitude with respect to terrain underlying the aircraft.
Figure 3:
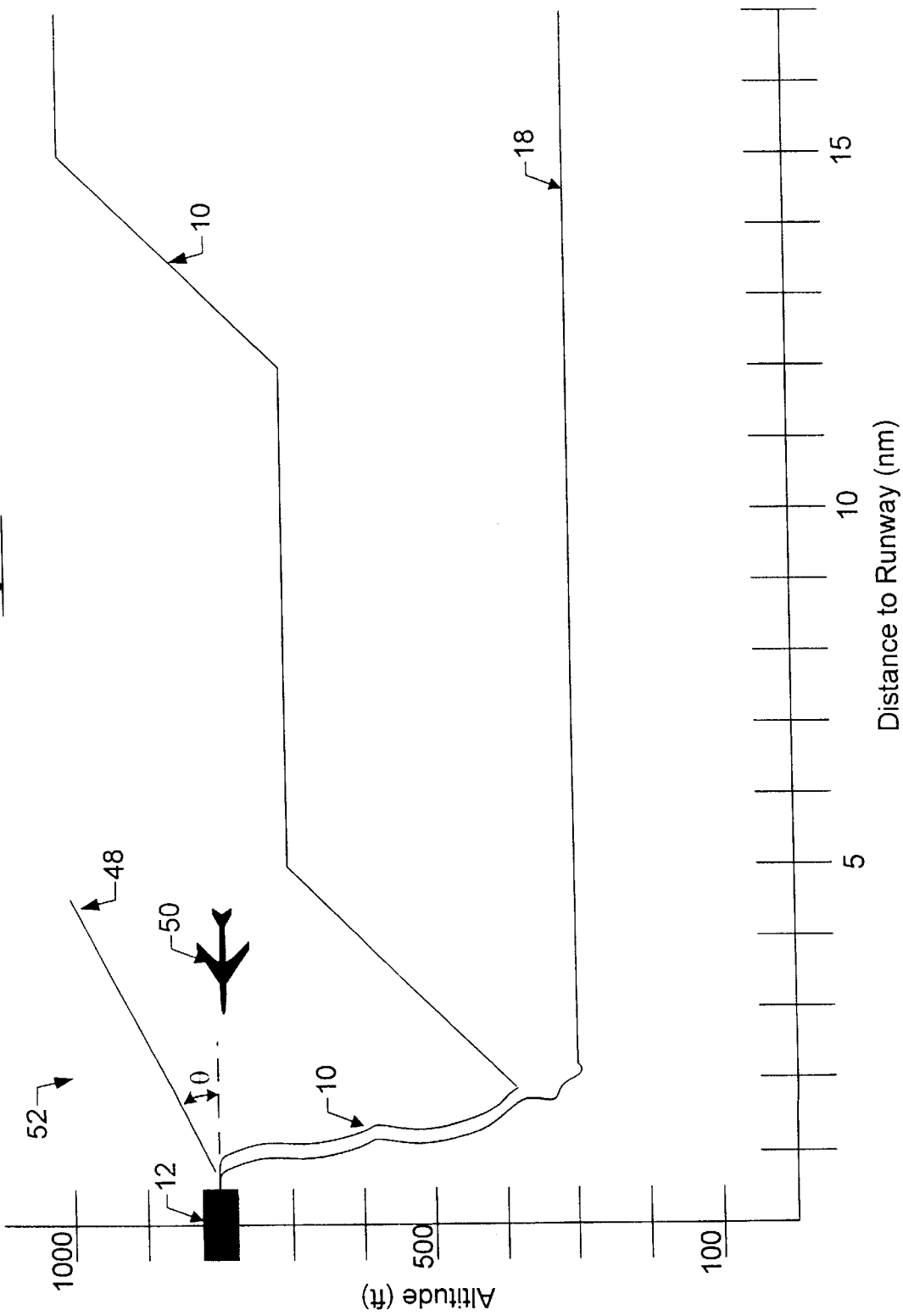
FIG. 3 is a side view illustrating graphically use of a runway field clearance floor envelope to provide alerts to an aircraft concerning the altitude of the aircraft with respect to a selected runway according to on embodiment of the present invention.

With reference to FIG. 3, the advantages of the apparatus, methods, and computer program products according to one embodiment of the present invention are illustrated. Specifically, FIG. 3 illustrates the situation depicted previously in FIG. 2. in which the elevation of the selected runway 12 or terrain or obstacles proximate to the selected runway are at a significantly higher elevation, (e.g., elevation 800 ft), than terrain 18 in the vicinity of, but less proximate to, the selected runway. (e.g., elevation 300 ft).

As discussed previously, the conventional ground proximity warning system generates a terrain clearance floor envelope 10 about the selected runway 12. The terrain clearance floor envelope represents minimum distances that the aircraft should maintain above underlying terrain when approaching the selected runway. However, because the terrain clearance floor envelope is related to the altitude between the aircraft and underlying terrain and not to altitudes between the aircraft and the selected runway, the terrain clearance floor envelope may not provide desired reaction time to the flight crew of an aircraft as to abrupt changes in elevation in either the selected runway or in terrain or obstacles in close proximity to the selected runway. In addition, the terrain clearance floor envelope also does not necessarily provide alerts to the flight crew if the aircraft is below a predetermined minimum glideslope with respect to the selected runway.

For this reason, the apparatus, methods, and computer program products of the present invention define a runway field clearance floor envelope 48. The runway field clearance floor envelope is an envelope representing a minimum or nominal glideslope angle θ with respect the selected runway 12. The runway field clearance envelope represents different preselected altitudes above the selected runway at respective distances from the selected runway. The preselected altitudes and respective distances of the runway field clearance floor envelope are typically chosen to reflect a minimum landing envelope with respect to the aircraft.

If an aircraft does not maintain at least the minimum landing envelope with respect to the selected runway, the apparatus, method, and computer program products of the present invention provide appropriate alerts to the flight crew of the aircraft. As such, the construction of the runway field clearance floor envelope by the apparatus, methods, and computer program products of the present invention takes into account abrupt changes in the elevation of the selected runway or terrain or obstacles proximate to the selected runway such that the flight crew are provided with an alert sufficiently far in advance of the runway that the flight path can be adjusted to accommodate these abrupt terrain changes.

For example, FIG. 3 illustrates an aircraft 50 that is approaching the selected runway 12. The aircraft is approximately 3 nm from the selected runway and is at an altitude of 750 ft. The terrain below the aircraft is approximately 300 ft. With reference to FIG. 1, at 3 nm away from the selected runway, the aircraft must maintain an altitude above underlying terrain of at least 300 ft to avoid alarms generated by the terrain clearance floor envelope. In this embodiment, the aircraft is above the terrain clearance floor envelope 10, and as such, the ground proximity warning system does not generate an alarm.

However, the altitude, (i.e., 750 ft), of the aircraft is below the altitude, (i.e., 800 ft), of the selected runway. As such, the aircraft is not above the minimal glideslope defined by the runway field clearance floor envelope 48 as defined by the present invention. In this instance, the apparatus, methods, and computer program products of the present will provide an indication to the flight crew of the aircraft, such that the aircraft may be positioned in the area 52 above the nominal landing envelope defined by the runway field clearance envelope.

These and other advantages are provided by an apparatus for determining whether an aircraft is located at a desired position with respect to a selected runway. With regard to the present invention, FIG. 4 illustrates one embodiment of an apparatus of the present invention. The apparatus of this embodiment includes a processor 46 associated with the look-ahead warning generator previously described. The processor may either be part of the processor of the look-ahead warning generator or it may be a separate processor located either internal or external to the look-ahead warning generator. It must be understood that the processor may consist of any number of devices. The processor may be a data processing device, such as a microprocessor or microcontroller or a central processing unit. The processor could be another logic device such as a DMA (Direct Memory Access) processor, an integrated communication processor device, a custom VLSI (Very Large Scale Integration) device, an ASIC (Application Specific Integrated Circuit) device or any other analog or digital circuitry designed to process the various signals as described above.

As detailed in the figures and description provided below, the apparatus, methods, and computer program products of the present invention define a runway field clearance floor envelope about a selected runway. The runway field clearance floor envelope typically defines a selected minimum landing envelope or minimum glideslope with respect to the selected runway. This selected minimum landing envelope may be either a specific envelope used for all selected runways or it may be defined based on the specifics of each individual selected runway. Further, the runway field clearance floor envelope may be defined with respect to the selected runway based on positional error factors related to the indicated position and altitude of the aircraft and the indicated position of the selected runway.

In addition to defining a runway field clearance floor envelope about a selected runway, the apparatus, methods, and computer program products also evaluate the position of the aircraft with respect to the runway field clearance floor envelope. If the aircraft is below the envelope, the apparatus, methods, and computer program products of the present invention provide an indication to the flight crew. In some embodiments, after a first indication has been provided to the flight crew, the apparatus, methods, and computer program products of the present invention may alter the indicated altitude of the aircraft or the minimum altitude provided by the runway field clearance floor envelope by a selected amount. As such, the aircraft must descend by the selected amount before the apparatus, methods, and computer program products of the present invention will generate the next indication to the flight crew, thereby insuring that the alarms are only provided as the situation becomes more severe.

Further, in some embodiments, the apparatus, methods, and computer program products of the present invention define both a runway field clearance floor envelope and a terrain clearance floor envelope about a selected runway. If the aircraft falls below either of the envelopes, the apparatus, methods, and computer program products of the present invention provide an indication to the flight crew of the aircraft. While the indications provided for falling below either of the envelopes can be identical, the apparatus, methods, and computer program products of the present invention generally provide a different indication for falling below the runway field clearance floor envelope than for falling below the terrain clearance floor envelope to assist the flight crew in appropriately altering the flight path.

Figure 5:
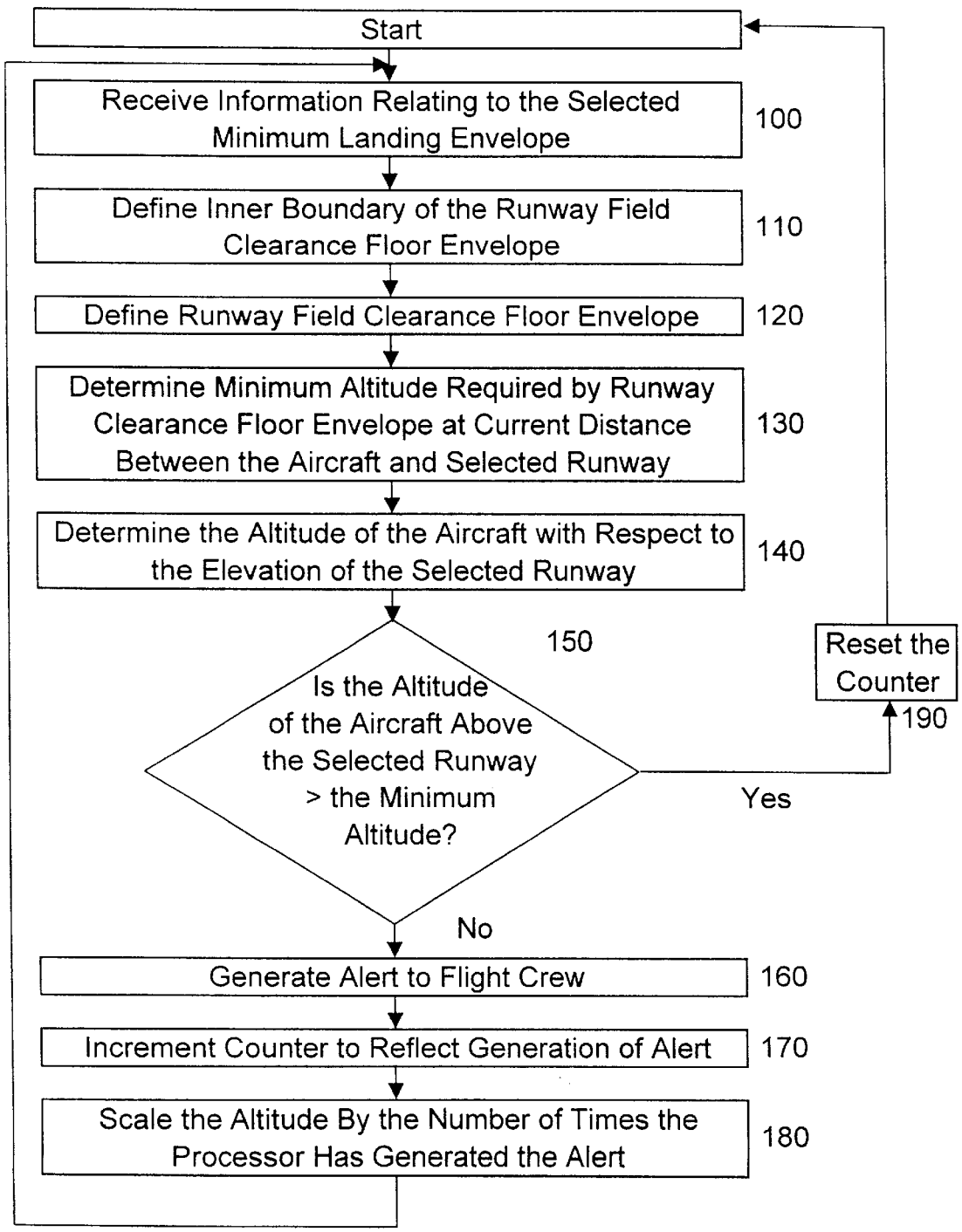
FIG. 5 is a block diagram of the operations performed to define a runway field clearance floor envelope about a selected runway and compare the position of an aircraft with respect thereto according to one embodiment of the present invention.
Figure 6:
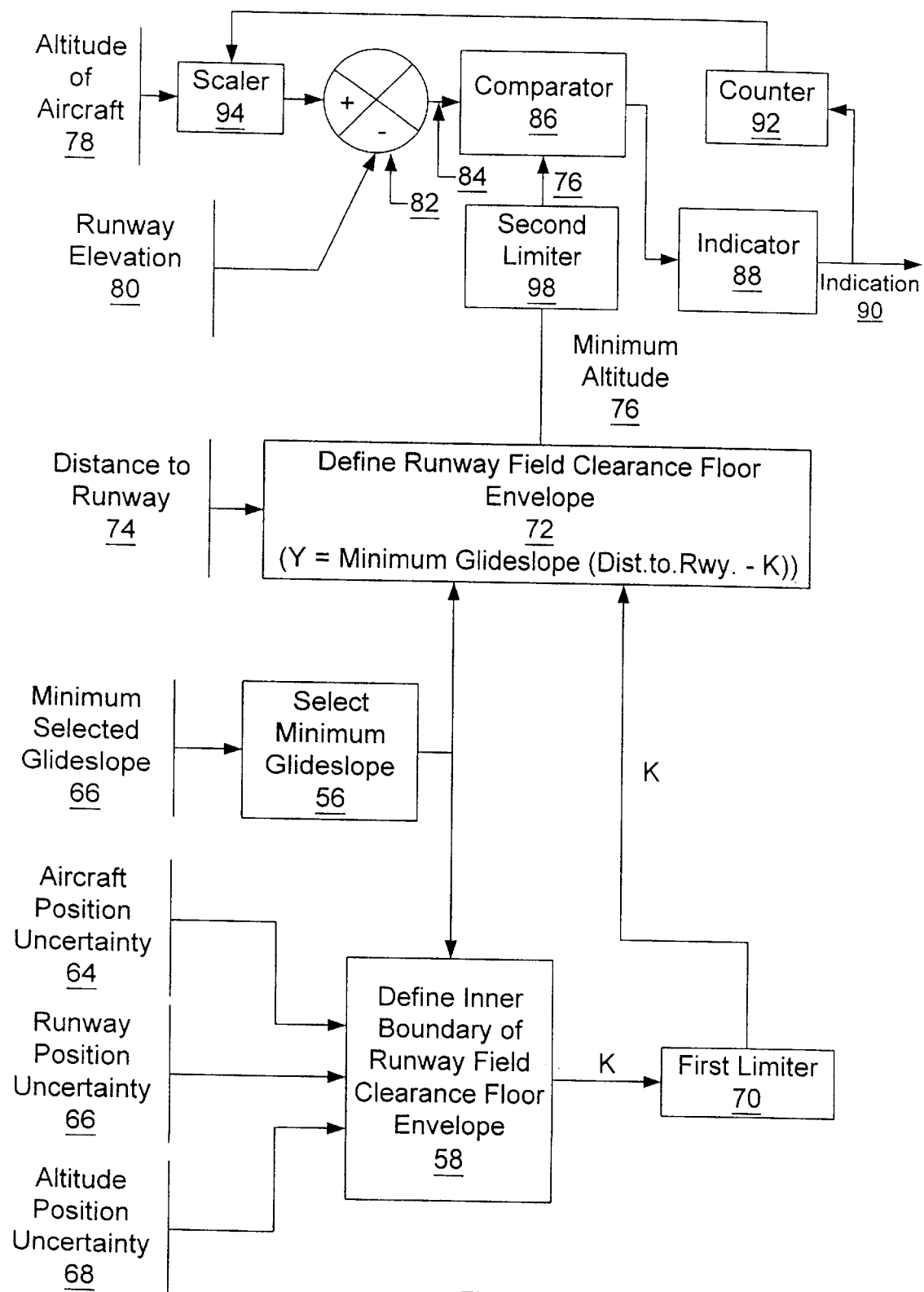
FIG. 6 is also a block diagram of the operations performed to define a runway field clearance floor envelope about a selected runway and compare the position of an aircraft with respect thereto according to one embodiment of the present invention.

With reference to FIGS. 4, 5, and 6, the generation of the runway field clearance floor envelope and use of the runway field clearance floor envelope to determine whether an aircraft is correctly positioned with respect to a selected runway is illustrated according to one embodiment. Specifically, FIG. 5 is an operational flow diagram, while FIG. 6 depicts the operations of the present invention in block diagram form.

In operation, to define the runway field clearance floor envelope, the processor initially receives information 54 concerning the selected minimal landing envelope. (See step 100). This information is typically in the form of a selected minimum glideslope angle. Specifically, aircraft typically land on a runway within a certain range of glideslope angles with respect to the runway. A typical range of glideslopes is 3° to 7°. Although an aircraft may land on a runway with a glideslope angle either above or below this range, such glideslope angles for landing are not prevalent and in some cases may be ill-advised. As such, if an aircraft that is approaching a runway does not have a glideslope angle with respect to the selected runway that is within the range of 3° to 7°, the aircraft is most likely not positioned properly to land on the selected runway.

In light of this, the apparatus, methods, and computer program products of the present invention, in one embodiment, may select a minimal glideslope to define the runway field terrain clearance envelope. For example, in one embodiment of the present invention, the apparatus, methods, and computer program products define a runway field clearance floor envelope that has glideslope angle with respect to the selected runway of 2°. In this embodiment, if the aircraft has a glideslope angle with respect to the selected runway that is less than 2°, it is determined that the aircraft is most likely at too shallow of an approach with respect to the selected runway.

In other embodiments of the present invention, the runway field clearance envelope may be defined by different glideslope angles. Further, in some embodiments, the apparatus, methods, and computer program products of the present invention may define the runway clearance field envelope to have a plurality of slope segments, representing different desired glideslope angles for the envelope at different distances from the selected runway.

Further, it must be understood that the particular glideslope angle or angles used to define the runway field clearance floor envelope may be selected values that are used for all selected runways or these values may be specific to each selected runway. For instance, in one embodiment of the present invention, the particular minimal landing envelope desired for a particular runway may be stored in a data base in the memory device 40 along with the coordinates of the selected runway. In this embodiment of the present invention, the processor 46 accesses the minimal landing envelope information related to the selected runway from the data table of the memory device 40. (See step 100).

After the processor has received information for the minimum landing envelope, the processor next defines the inner boundary of the runway field clearance floor envelope. (See step 110). Specifically, the processor first determines the location of the inner boundary of the runway field clearance floor envelope. (See block 58). As discussed in detail in U.S. patent application Ser. No. 09/496,296 to Ishihara, Gremmert, and Johnson, entitled: "Apparatus, Methods, and Computer Program Products for Generating Terrain Clearance Floor Envelopes About A Runway," in some embodiments, it is advantageous to account for errors that may be associated with the indicated position of the selected runway and the indicated altitude and position of the aircraft in defining clearance floor envelopes about a selected runway. U.S. patent application Ser. No. 09/496,296 to Ishihara et al. is assigned to the assignee of the present application and is incorporated by reference herein.

Figure 7:
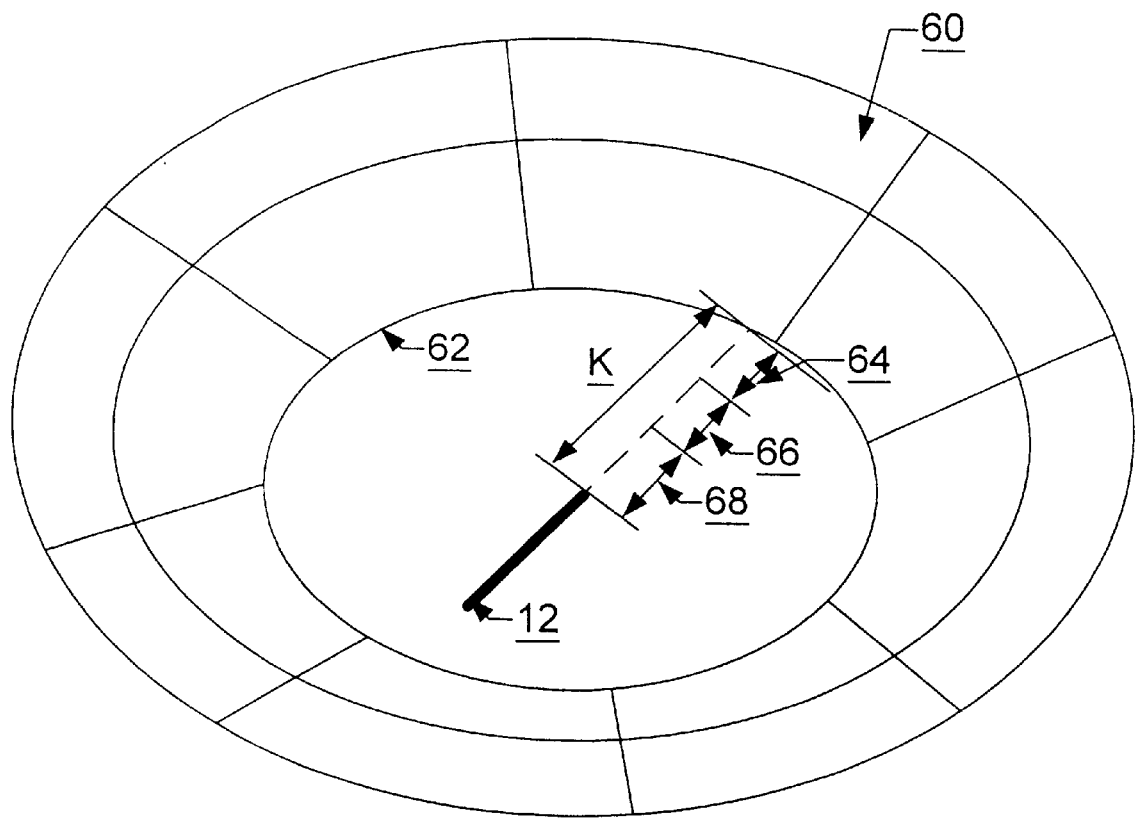
FIG. 7 is a perspective view illustrating graphically the determination of an inner boundary of a runway field clearance floor envelope according to one embodiment of the present invention.

Specifically, with reference to FIG. 7, the determination of the location of the inner boundary of the runway field clearance floor envelope is illustrated. FIG. 7 is a perspective view of the selected runway 12 with a runway field clearance floor envelope 60 according to one embodiment of the present invention generated about the selected runway. Importantly, the runway field clearance floor envelope includes an inner boundary 62 proximate to the selected runway. As illustrated by FIG. 7, there is a distance K between the selected runway and the inner boundary of the runway field clearance floor envelope. This distance K represents a calculated position uncertainty between the inner boundary and selected runway. With reference to FIG. 7, in one embodiment of the present invention, the calculated position uncertainty may be defined by either one or more of the following uncertainties: 1) an aircraft position uncertainty factor 64, 2) a runway position uncertainty factor 66, and 3) an altitude position uncertainty factor 68. Using one or all of these factors, the apparatus, methods, and computer program products of the present invention can more precisely define the location of inner boundary of the runway field clearance floor envelope. Specifically, in one embodiment of the present invention, the calculated position uncertainty K is defined by the following equation:

$$K = Aircraft.Pos.Uncert. + Rwy.Pos.Uncert. + Alt.Pos.Uncert.$$

However, it must be understood that in some embodiments, the position uncertainty K may be calculated based on only one or differing combinations of these uncertainty factors. As described above, the calculated position uncertainty K defines the inner boundary of the runway field clearance floor envelope in at least one embodiment. (See step 110).

After the processor has determined the calculated position uncertainty K, in some embodiments, the processor may limit the value of the calculated position uncertainty K with a first limiter 70. For example, in one embodiment, the processor limits the value of the calculated position uncertainty K to: 0.5 nm<K<1.0 nm. In other embodiments, the processor may only limit the calculated position uncertainty K by a minimum value of 0.5 nm, while allowing K to have any maximum value.

After determining the location of the inner boundary, the processor of the present invention next defines the runway field clearance floor envelope, (See block. (See step 120). As discussed previously, the runway field clearance floor envelope is typically defined by a surface extending radially outward from the inner boundary at the minimal landing glideslope angle 0 with respect to the selected runway. For example, in one embodiment, the runway field clearance floor envelope is defined by the equation:

$$y = m(x)$$

or $$y = \text{Minimum Glideslope (Distance to Runway} - \text{Pos.Uncert.}K)$$

In this equation, the minimum glideslope angle defines the slope of the line and is provided in terms of rise in altitude versus distance to the selected runway. For example, as discussed previously, a typical minimum glideslope angle is 2°. A glideslope angle of 2° is approximately equal to 200 ft of altitude for every 1 nm of distance from the selected runway. As such, in embodiments of the present invention in which the minimum glideslope is 2°, the glideslope angle is expressed in the above equation as 200 ft/nm.

Based on the above equation of the runway field clearance floor envelope, the processor can determine the minimum altitude required by the runway field clearance floor envelope at the current distance between the aircraft and the selected runway, (see block 72). (See step 130). Specifically, the processor receives the current distance 74 between the selected runway and the aircraft. Using this distance and the calculated position uncertainty, the processor determines the minimum altitude 76 defined by the runway field clearance floor envelope. This minimum altitude 76 represents the minimum altitude at the current distance of the aircraft from the selected runway that the aircraft must maintain above the selected runway to be above the runway field clearance floor envelope. Altitudes with respect to the selected runway that are less than this minimum altitude are below the runway field clearance floor envelope.

As illustrated in the above equation, the processor uses the current distance between the selected runway and aircraft to determine the minimum altitude that the aircraft should maintain with respect to the selected runway. In some embodiments of the present invention, the distance between the selected runway and the aircraft is a coordinate distance defined by the coordinate positions of the selected runway and aircraft. However, in some embodiments, the distance used by the processor of the present invention is a corrected distance value. The corrected distance value is a calculated value that accounts for the altitude of the aircraft with respect to the selected runway, as opposed to a coordinate distance. The determination of the corrected distance to runway value is described in detail in U.S. patent application Ser. No. 09/495,630 to Conner and Johnson, entitled: "Methods, Apparatus And Computer Program Products For Determining A Corrected Distance Between An Aircraft And A Selected Runway." This patent application is assigned to the assignee of the present application and is incorporated herein by reference.

In some embodiments of the present invention, the processor may limit the runway field clearance floor envelope with a second limiter 98. Specifically, in some embodiments, it is advantageous to only monitor the altitude of the aircraft with respect to the elevation of the selected runway when the aircraft is in close proximity to the selected runway. For instance, if the aircraft is within a specified range with respect to the selected runway, such as within 5 nm, it is typically advantageous to provide the flight crew with alerts as to the altitude of the aircraft with respect to the selected runway. However, for farther distances, such as 12 nm, the aircraft is far enough away from the selected runway that the alerts may be a nuisance. As such, according to one embodiment of the present invention, the processor limits the maximum value of the minimum altitude 76.

For example in one embodiment of the present invention, the processor limits the minimum altitude value 76 to the altitude value on the runway field clearance floor envelope at a predetermined outer boundary, such as 5 nm from the selected runway. For instance, if the runway field clearance floor envelope is defined by a glideslope angle of 2°, the processor will limit the minimum altitude 76 to a value in the range of 900 to 1000 ft, (i.e., (4 nm+K)×200 ft/nm) at the outer boundary of (4 nm+K) from the runway.

After the processor of the present invention has determined the minimum altitude 76, the processor next determines whether the aircraft has an altitude with respect to the selected runway that is at least as great as the minimum altitude 76. To determine whether the altitude of the aircraft above the selected runway is greater than the minimum altitude 76, the processor compares the minimum altitude 76 required by the runway field clearance floor envelope to the current altitude of the aircraft with respect to the elevation of the selected runway. Specifically, the processor receives the altitude 78 of the aircraft and from this altitude subtracts the elevation 80 of the selected runway via a summer 82 to provide the altitude 84 of the aircraft above the selected runway. (See step 140). The processor compares the altitude 84 of the aircraft above the selected runway to the minimum altitude 76 defined by the runway field clearance floor envelope, via a comparator 86. (See step 150). If the altitude of the aircraft with respect to the elevation of the aircraft is less than the minimum altitude, the processor determines that the aircraft is below the runway field clearance floor envelope. In this instance, the processor provides an indication by the indicator 88 to the flight crew. (See step 160). For instance, the processor may generate an aural warning by the warning generator 42 and/or a visual warning by display 44. As such, the flight crew is made aware that the aircraft is below the minimum glideslope angle defined by the runway field clearance floor envelope and can take appropriate reaction to bring the aircraft to an altitude above the envelope.

As discussed above, the processor of the present invention subtracts the elevation 80 of the selected runway from the altitude of the aircraft 78. The elevation of the selected runway is typically stored in the database of the memory device 40 along with other information relating to the selected runway, such as coordinate position, runway position uncertainty, etc. In this instance, the processor of the present invention accesses the database of the memory device and retrieves the elevation of the selected runway.

As also discussed above. the processor receives the altitude of the aircraft 78. In this instance, the altitude refers to the indication of the altitude of the aircraft with reference to sea level. In some embodiments of the present invention, this altitude may be provided by a Barometric Pressure sensor. However, due to errors typically associated with the Barometric Pressure sensor due to calibration and temperature drift, in one advantageous embodiment of the present invention, the altitude is a geometric altitude. Geometric altitude is a computed altitude based on GPS. altitude, Radio Altitude, and terrain and runway elevation data. The geometric altitude compensates for errors in the altitude indication that is provided by a Barometric Pressure sensor. Information related to the calculation of the geometric altitude is provided in detail in U.S. Pat. No. 09/255,670 to Johnson and Muller, entitled: "Method and Apparatus for Determining Altitude," filed Feb. 23, 1999. The content of this application is incorporated herein by reference.

In addition to providing alerts to the flight crew concerning the position of the aircraft with respect to the selected runway, in some embodiments of the present invention, the processor may also limit the number of alerts provided to the flight crew to thereby reduce the number of nuisance alarms. Specifically, as stated previously, in one embodiment of the present invention, the processor may limit, via second limiter 98, the maximum distance from the selected runway for which the processor will provide alerts as to the aircraft's position with respect to the selected runway.

In another embodiment, the processor may limit the number of nuisance alarms generated by requiring that the aircraft remain below the runway field clearance floor envelope for longer than a predetermined time prior to generation of an alert. For example, in one embodiment of the present invention, the processor will not generate an alert until the aircraft has remained below the runway field clearance floor envelope for 0.8 seconds. In other embodiments, the processor may require a longer or shorter predetermined time period, depending on the embodiment and the aircraft.

In another embodiment, the processor of the present invention may limit the number of generated alerts by altering either the indicated altitude of the aircraft or the minimum value provided from the runway field clearance floor envelope.

Specifically, in one embodiment of the present invention, after the processor has generated an alert, the processor may increase the indicated altitude of the aircraft by a selected amount prior to comparing the altitude to the minimum altitude from the runway field clearance floor envelope. In this instance, the aircraft will have to descend in altitude with respect to the selected runway by the increased amount. before the next alert will be generated. In another embodiment, the processor may decrease the minimum altitude indicated by the runway field clearance floor envelope by a selected amount. Similar to the previous embodiment, the aircraft will have to descend in altitude with respect to the selected runway by the selected amount before the next alarm will be generated.

FIGS. 4, 5, and 6 further illustrate an embodiment in which the processor increases the indicated altitude of the aircraft to thereby reduce the number of alerts generated according to one embodiment of the present invention. Specifically, in this embodiment, the processor includes a counter 92 that counts the number of times during the same penetration of the aircraft below the runway field clearance floor envelope that an alert is generated by the processor to the flight crew of the aircraft. (See step 170). The counts indicated by the counter are provided to a scaler 94 that is configured to scale the indicated altitude 78 of the aircraft. Importantly, the processor scales the indicated altitude of the aircraft dependent on the number of times that the processor has previously provided an alert. (See step 180). For instance, in one embodiment, the processor scales, via the scaler, the indicated altitude of the aircraft based on the following equation:

$$\text{Altitude}_{Scaled} = \text{Altitude} \ (1 + (\text{Counter} \times \text{Scale Factor}))$$

where

Counter=number of times that an alert has been previously generated

Scale Factor=preselected scale factor.

As an example, in one embodiment of the present invention, the processor may require that the aircraft descend in altitude a maximum of 20% of its current altitude before a next alert is generated. In this embodiment, the scale factor value would be 0.2. Thus, if the current altitude of the aircraft is 500 ft and the processor has generated only one previous alert, then the processor would scale the altitude of the aircraft as follows:

$$\text{Altitude}_{Scaled} = \text{Altitude}(1 + (\text{Counter} \times \text{Scale Factor}))$$

or $$= 500 \text{ ft } (1 + (1 \times .2))$$

or $$= 600 \text{ ft.}$$

Similar steps would be used to scale the minimum altitude of the runway field clearance floor envelope. Specifically, in this embodiment, the scaler 94 would be connected to the output of the second limiter 98. The processor, via the scaler, would scale the minimum altitude value 76 down by the preselected amount such that the aircraft would have to descend the preselected amount for the processor to generate the next alert. Specifically, the processor would scale the minimum altitude value 76 by the following equation:

$$\text{Altitude}_{Scaled} = \text{Altitude } (1-(\text{Counter} \times \text{Scale Factor}))$$

where

Counter=number of times that an alert has been previously generated

Scale Factor=preselected scale factor.

As indicated in FIG. 5, the processor may reset the counter 96, (See step 190), when the aircraft increases its altitude with respect to the selected runway to an altitude that exceeds the runway field clearance floor envelope. (See step 150).

In one advantageous embodiment, the processor of the present invention may generate both a runway field clearance floor envelope and a terrain clearance floor envelope. Specifically, in this embodiment of the present invention, the processor generates the runway field clearance floor envelope as detailed above. Additionally, the processor of the present invention also generates a terrain clearance floor envelope similar to the terrain clearance floor envelope illustrated in FIGS. 1 and 2. As discussed previously, the terrain clearance floor envelope is a clearance envelope that represents minimum altitudes that an aircraft should maintain above underlying terrain for different distances between the aircraft and selected runway. Generation of the terrain clearance floor envelope is provided in detail in U.S. Pat. No. 09/496,296 to Ishihara, Gremmert, and Johnson, entitled:"Apparatus, Methods, and Computer Program Products for Generating Terrain Clearance Floor Envelopes About A Runway." This application is assigned to the assignee of the present application. The contents of this application are incorporated herein by reference.

In this embodiment of the present invention, the processor monitors both the altitude of the aircraft with respect to the selected runway and the altitude of the aircraft with respect to terrain underlying the aircraft. If the aircraft falls below either the runway field clearance floor envelope or the terrain clearance floor envelope, the processor will provide an alert, typically different alerts, to the flight crew as described above. As such, the present invention provides apparatus, methods, and computer program products that determine whether an aircraft maintains an altitude with respect to the selected runway that is greater than a minimum landing envelope, while at the same time providing alerts if the aircraft falls below a minimum altitude above underlying terrain.

In addition to providing apparatus and methods, the present invention also provides computer program products for defining a runway field clearance floor envelope for use in a ground proximity warning system. The computer program products have a computer readable storage medium having computer readable program code means embodied in the medium. With reference to FIG. 4, the computer readable storage medium may be part of the memory device 40, and the processor 46 of the present invention may implement the computer readable program code means to define a runway field clearance floor envelope as described in the various embodiments above.

The computer-readable program code means includes first computer instruction means for defining a runway field clearance floor envelope about the selected runway representing different preselected altitudes above the selected runway it respective distances from the selected runway. Specifically, first computer instruction means defines a runway field clearance floor envelope representing a minimum landing envelope or glideslope angle that an aircraft may have respect to the selected runway. The computer readable program code means also includes second computer instruction means for comparing the position of the aircraft to the runway field clearance floor envelope and third computer instruction means, responsive to the second computer instruction means, for providing an indication if the aircraft is positioned below the runway field clearance floor envelope.

In one embodiment of the present invention, the second computer instruction means compares a distance between the aircraft and selected runway to the runway field clearance floor envelope and determines a preselected altitude of the aircraft above the selected runway based on the runway field clearance floor envelope. The second computer instruction means next compares the preselected altitude to the altitude of the aircraft above the selected runway, and provides an indication if the altitude of the aircraft above the selected runway is no more than the preselected altitude.

In another embodiment, the computer-readable program code means further includes fifth computer instruction means for defining a terrain clearance floor envelope about the selected runway representing different preselected minimum altitudes of the aircraft above terrain located below a current position of the aircraft for different distances between the aircraft and the selected runway. In this embodiment, the second computer instruction means compares the altitude of the aircraft above the terrain below the current position of the aircraft to the minimum altitude indicated by the terrain clearance floor envelope for the distance between the aircraft and selected runway. Further, the third computer instruction means provides an indication that the aircraft is below the terrain clearance floor envelope if the altitude of the aircraft above the terrain is no more than the minimum altitude.

In one further embodiment, the computer-readable program code means further includes sixth computer instruction means for generating a ground proximity warning alert if the aircraft is below at least one of the runway field clearance floor envelope and the terrain clearance floor envelope for more than the predetermined time.

In this regard, FIGS. 4, 5, and 6 are block diagram, flowchart and control flow illustrations of methods, systems and program products according to the invention. It will be understood that each block or step of the block diagram, flowchart and control flow illustrations, and combinations of blocks in the block diagram, flowchart and control flow illustrations, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s). Accordingly, blocks or steps of the block diagram, flowchart or control flow illustrations support combinations of means for performing the specified functions. combinations of steps for performing the specified functions and program instruction means for performing the specified functions. It will also be understood that each block or step of the block diagram, flowchart or control flow illustrations, and combinations of blocks or steps in the block diagram, flowchart or control flow illustrations, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer program product for use in a ground proximity warning system to determine whether an aircraft is located at a desired position with respect to a selected runway, wherein the computer program product comprises:
a computer readable storage medium having computer readable program code means embodied in said medium, said computer-readable program code means comprising:
first computer instruction means for defining a runway field clearance floor envelope about the selected runway representing different preselected altitudes above the selected runway at respective distances from the selected runway;
second computer instruction means for comparing the position of the aircraft to the runway field clearance floor envelope; and
third computer instruction means, responsive to said second computer instruction means, for providing an indication if the aircraft is positioned below the runway field clearance floor envelope.

2. A computer program product according to claim 1, wherein said second computer instruction means compares a distance between the aircraft and selected runway to the runway field clearance floor envelope and determines a preselected altitude of the aircraft above the selected runway based on the runway field clearance floor envelope, and wherein said second computer instruction means compares the preselected altitude to the altitude of the aircraft above the selected runway, and provides an indication if the altitude of the aircraft above the selected runway is no more than the preselected altitude.

3. A computer program product according to claim 2 further comprising fourth computer instruction means for storing a data base containing position and elevation data for at least one selected runway, and wherein said second computer instruction means accesses the elevation data related to the selected runway stored in said storing step, and subtracts the elevation of the selected runway from the altitude of the aircraft.

4. A computer program product according to claim 3, wherein the altitude of the aircraft is a calculated geometric altitude representing the altitude of the aircraft above sea level, and wherein second computer instruction means subtracts the stored elevation data related to the selected runway from the geometric altitude of the selected aircraft.

5. A computer program product according to claim 3, wherein a barometric pressure sensor represents the altitude of the aircraft above sea level, and wherein second computer instruction means subtracts the stored elevation data related to the selected runway from the altitude of the selected aircraft.

6. A computer program product according to claim 1, wherein said first computer instruction means defines the runway field clearance floor envelope dependent upon at least two boundaries, and said first computer instruction means defines at least one of the boundaries based on at least one of a runway position quality factor, an altitude data quality factor, and an aircraft position quality factor.

7. A computer program product according to claim 6, wherein said first computer instruction means sums the runway position quality factor, altitude data quality factor, and aircraft position quality factor to define an inner boundary of the runway field clearance floor envelope at an inner position proximate to the selected runway, and wherein said first computer instruction means sums the runway position quality factor, the altitude data quality factor, the aircraft position quality factor, and a predetermined outer distance representing a predetermined distance from the selected runway to define an outer boundary of the runway field clearance floor envelope at a second position.

8. A computer program product according to claim 7, wherein said first computer instruction means further defines the runway field clearance floor envelope to have a preselected inner boundary altitude at the inner boundary and a preselected outer boundary altitude at the outer boundary to thereby define a runway field clearance floor envelope having a slope defined by the inner and outer boundary altitudes and positions.

9. A computer program product according to claim 1 further comprises fifth computer instruction means for defining a terrain clearance floor envelope about the selected runway representing different preselected minimum altitudes of the aircraft above terrain located below a current position of the aircraft for different distances between the aircraft and the selected runway, wherein said second computer instruction means compares the altitude of the aircraft above the terrain below the current position of the aircraft to the minimum altitude indicated by the terrain clearance floor envelope for the distance between the aircraft and selected runway, and wherein said third computer instruction means provides an indication that the aircraft is below the terrain clearance floor envelope if the altitude of the aircraft above the terrain is no more than the minimum altitude.

10. A computer program product according to claim 9 further comprising sixth computer instruction means for generating a ground proximity warning alert if the aircraft is below at least one of the runway field clearance floor envelope and the terrain clearance floor envelope for more than the predetermined time.

11. A computer program product according to claim 9, wherein if the aircraft is below the runway field clearance floor envelope for more than a predetermined time, said computer program product further comprises seventh computer instruction means for increasing an altitude value indicating the altitude of the aircraft above the selected runway by a selected amount, such that the aircraft must decrease in altitude by the selected amount before said fifth computer instruction means generates a next ground proximity alert.

12. A computer program product according to claim 11, wherein if the aircraft is below the terrain clearance floor envelope floor for more than a predetermined time, said computer program product further comprises eighth computer instruction means for increasing an altitude value indicating the altitude of the aircraft by a selected amount, such that the aircraft must decrease in altitude by the selected amount before said fifth computer instruction means generates a next ground proximity alert.

13. A computer program product according to claim 1 further comprises ninth computer instruction means for storing a data base containing preselected subtracting the stored elevation data related to the selected runway from the altitude of the selected aircraft.

14. An apparatus for use in a ground proximity warning system for determining whether an aircraft is located at a desired position with respect to a selected runway, wherein said apparatus comprises a processor that:
 defines a runway field clearance floor envelope about the selected runway representing different preselected altitudes above the selected runway at respective distances from the selected runway;
 determines an inner boundary of the runway field clearance floor envelope at an inner position proximate to the selected runway by summing the runway position quality factor, altitude data quality factor, and aircraft position quality factor;
 determines an outer boundary of the runway field clearance floor envelope at an outer position by summing the runway position quality factor, the altitude data quality factor, the aircraft position quality factor, and a predetermined outer distance representing a predetermined distance from the selected runway; and
 compares the position of the aircraft to the runway field clearance floor envelope, wherein if the aircraft is positioned below the runway field clearance floor envelope, said processor provides an indication thereof.

15. The apparatus according to claim 14, wherein said processor further defines the runway field clearance floor envelope to have a preselected inner boundary altitude at the inner boundary, and a preselected outer boundary altitude at the outer boundary to thereby define a runway field clearance floor envelope having a slope defined by the inner and outer boundary altitudes and the inner and outer positions.

16. An apparatus for use in a ground proximity warning system for determining whether an aircraft is located at a desired position with respect to a selected runway, wherein said apparatus comprises:
 a memory device comprising a data base containing position and elevation data for the selected runway,
 a processor in electrical communication with said memory device, wherein said processor;
  defines a runway field clearance floor envelope about the selected runway representing different preselected altitudes above the selected runway at respective distances from the selected runway;
  determines the altitude of the aircraft above the selected runway by accessing elevation data related to the selected runway from said memory device and subtracting the levitation of the selected runway from the altitude of the aircraft;
  compares a distance between the aircraft and selected runway to the runway field clearance floor envelope and determines a preselected altitude of the aircraft above the selected runway based on the runway field clearance floor envelope,
 wherein said processor compares the preselected altitude to the altitude of the aircraft above the selected runway, and wherein if the altitude of the aircraft above the selected runway is no more than the preselected altitude, said processor provides an indication thereof.

17. The apparatus according to claim 16, wherein the altitude of the aircraft is a calculated geometric altitude representing the altitude of the aircraft above sea level, and wherein said processor subtracts the elevation data related to the selected runway from the geometric altitude of the selected aircraft.

18. The apparatus according to claim 16, wherein a barometric pressure sensor represents the altitude of the aircraft above sea level, and wherein said processor subtracts the elevation data related to the selected runway from the altitude of the selected aircraft.

19. An apparatus for use in a ground proximity warning system for determining whether an aircraft is located at a desired position with respect to a selected runway, wherein said apparatus comprises a processor that:
 defines a runway field clearance floor envelope about the selected runway representing different preselected altitudes above the selected runway at respective distances from the selected runway, wherein said processor compares the position of the aircraft to the runway field clearance floor envelope, and wherein if the aircraft is positioned below the runway field clearance floor envelope, said processor provides an indication thereof; and
 defines a terrain clearance floor envelope about the selected runway representing different preselected minimum altitudes of the aircraft above terrain located below the position of the aircraft for different distances between the aircraft and the selected runway, wherein said processor compares the altitude of the aircraft above the terrain below the position of the aircraft to the minimum altitude indicated by the terrain clearance floor envelope for the distance between the aircraft and selected runway, and wherein if the altitude of the aircraft above the terrain is no more than the minimum altitude indicating that the aircraft is below the terrain clearance floor envelope, said processor provides an indication thereof.

20. The apparatus according to claim 19, wherein if said processor determines that the aircraft is below at least one of the runway field clearance floor envelope and the terrain clearance floor envelope for more than a predetermined time, said processor generates a ground proximity alert.

21. An apparatus according to claim 20, wherein if said processor determines that the aircraft is below the runway field clearance floor envelope for more than a predetermined time, said processor increases an altitude value indicating the altitude of the aircraft above the selected runway by a selected amount, such that the aircraft must decrease in altitude by the selected amount before said processor will generate a next ground proximity alert.

22. An apparatus according to claim 20, wherein if said processor determines that the aircraft is below the terrain clearance floor envelope floor for more than a predetermined time, said processor increases an altitude value indicating the altitude of the aircraft by a selected amount, such that the aircraft must decrease in altitude by the selected amount before said processor will generate a next ground proximity alert.

23. A method for use in a ground proximity warning system for determining whether an aircraft is located at a desired position with respect to a selected runway, wherein said method comprises the steps of:
defining a runway field clearance floor envelope about the selected runway representing different preselected altitudes above the selected runway at respective distances from the selected runway;
determining an inner boundary of the runway field clearance floor envelope at an inner position proximate to the selected runway by summing the runway position quality factor, altitude data quality factor;
determining an outer boundary of the runway field clearance floor envelope at a second position by summing the runway position quality factor, the altitude data quality factor, the aircraft position quality factor, and a predetermined outer distance representing a predetermined distance from the selected runway;
comparing the position of the aircraft to the runway field clearance floor envelope; and
providing an indication if the aircraft is positioned below the runway field clearance floor envelope.

24. The method according to claim 23, wherein said defining step further comprises after said summing steps the step of defining the runway field clearance floor envelope to have a preselected inner boundary altitude at the inner boundary and a preselected outer boundary altitude at the outer boundary to thereby define a runway field clearance floor envelope having a slope defined by the inner and outer boundary altitudes and positions.

25. A method for use in a ground proximity warning system for determining whether an aircraft is located at a desired position with respect to a selected runway, wherein said method comprises the steps of.
storing a database containing position and elevation data for the selected runway;
defining a runway field clearance floor envelope about the selected runway representing different preselected altitudes above the selected runway at respective distances from the selected runway;
determining the altitude of the aircraft above the selected runway by subtracting the elevation of the selected runway from the altitude of the aircraft;
comparing a distance between the aircraft and selected runway to the runway field clearance floor envelope;
determining a preselected altitude o f the aircraft above the selected runway based on the runway field clearance floor envelope;
comparing the preselected altitude to the altitude of the aircraft above the selected runway;
and providing an indication if the altitude of the aircraft above the selected runway is no more than the preselected altitude.

26. The method according to claim 25, wherein the altitude of the aircraft is a calculated geometric altitude representing the altitude of the aircraft above sea level, and wherein said subtracting step comprises subtracting the stored elevation data related to the selected runway from the geometric altitude of the selected aircraft.

27. The method according to claim 25 further comprising the step of storing a data base containing preselected altitudes that an aircraft should maintain above a selected runway at respective distances from the selected runway, and wherein said defining step comprises defining the runway field clearance floor envelope based on the preselected altitudes at respective distances stored in said storing step.

28. The method according to claim 25, wherein a barometric pressure sensor represents the altitude of the aircraft above sea level, and wherein said subtracting step comprises subtracting the stored elevation data related to the selected runway from the altitude of the selected aircraft.

29. A method for use in a ground proximity warning system for determining whether an aircraft is located at a desired position with respect to a selected runway, wherein said method comprises the steps of.
defining a runway field clearance floor envelope about the selected runway representing different preselected altitude above the selected runway at respective distances from the selected runway;
comparing the position of the aircraft to the runway field clearance floor envelope;
providing an indication if the aircraft is positioned below the runway field clearance floor envelope;
defining a terrain clearance floor envelope about the selected runway representing different preselected minimum altitudes of the aircraft above terrain located below the aircraft for different distances between the aircraft and the selected runway;
comparing the altitude of the aircraft above the terrain to the minimum altitude indicated by the terrain clearance floor envelope for the distance between the aircraft and selected runway; and
providing an indication that the aircraft is below the terrain clearance floor envelope if the altitude of the aircraft above the terrain is no more than the minimum altitude.

30. The method according to claim 29 further comprising the step of generating a ground proximity warning alert if the aircraft is below at least one of the runway field clearance floor envelope and the terrain clearance floor envelope for more than the predetermined time.

31. A method according to claim 30, wherein if the aircraft is below the runway field clearance floor envelope for more than a predetermined time, said method further comprises the step of increasing an altitude value indicating the altitude of the aircraft above the selected runway by a selected amount, such that the aircraft must decrease in altitude by the selected amount before said generating step will generate a next ground proximity alert.

32. A method according to claim 30, wherein if the aircraft is below the terrain clearance floor envelope floor for more than a predetermined time, method further comprises the step of increasing an altitude value indicating the altitude of the aircraft by a selected amount, such that the aircraft must decrease in altitude by the selected amount before said generating step will generate a next ground proximity alert.

33. An apparatus for generating a runway field clearance floor envelope for use in a ground proximity warning system, wherein said apparatus comprises a processor that generates a runway field clearance floor envelope about a selected runway representing a selected minimum landing pattern for landing an aircraft on the selected runway, wherein said processor defines the runway field clearance floor envelope having:

different preselected altitudes above the selected runway at different respective distances from the selected runway, wherein each of the different preselected altitudes represent a selected minimum altitude above the selected runway that the aircraft should maintain at the respective distance from the selected runway for landing the aircraft on the selected runway;

an inner boundary of the runway field clearance floor envelope located proximate to the selected runway, wherein the inner boundary location is determined by the sum of the runway position quality factor, altitude data quality factor, and aircraft position quality factor; and an outer boundary of the runway field clearance floor envelope located at an outer position from the selected runway, wherein the outer boundary location is determined by the sum of the runway position quality factor, the altitude data quality factor, the aircraft position quality factor, and a predetermined outer distance representing a predetermined distance from the selected runway.

34. The apparatus according to claim 33 further comprising a memory device in electrical communication with said processor, wherein said memory device includes a data base containing preselected altitudes that an aircraft should maintain above a selected runway at respective distances from the selected runway, and wherein said processor accesses the memory device and defines the runway field clearance floor envelope based on the preselected altitude at respective distances stored in the memory device.

35. The apparatus according to claim 33 further comprising a memory device in electrical communication with said processor, wherein said memory device includes a data base containing preselected altitudes that an aircraft should maintain above a selected runway at respective distances from the selected runway, and wherein said processor accesses the memory device and defines the runway field clearance floor envelope based on the preselected altitude at respective distances stored in the memory device.

* * * * *